United States Patent Office 2,836,606
Patented May 27, 1958

2,836,606
SALTS OF 1,1,2,5,6,6-HEXACYANO-3,4-DIAZAHEXADIENE

William J. Middleton, Claymont, Del., assignor to E. I. du Pont de Nemours and Company, Wilmington, Del., a corporation of Delaware No Drawing. Application September 4, 1956
Serial No. 607,569

7 Claims. (Cl. 260—391)

This invention is concerned with a new acidic organic compound and its salt which are useful as dyes.

In the manufacture of synthetic dyes, the cost of the dye is frequently dependent on the number of chemical steps required for its synthesis. Accordingly, dyes of relatively simple structure which can be prepared with a minimum of chemical operations represent a desirable goal because of their potential economy in cost.

This invention has as an object the preparation of new dyes. A further object is the preparation of components for printing and hectograph inks. Other objects will appear hereinafter.

These objects are accomplished by the present invention of 1,1,2,5,6,6-hexacyano-3,4-diazahexadiene and its salts, and of a process for their preparation by the reaction of tetracyanoethylene with hydrazine. In this reaction two moles of tetracyanoethylene react with one mole of hydrazine and two moles of a base selected from the group consisting of hydrazine, quaternary ammonium hydroxides, alkali metal hydroxides and alkaline earth metal hydroxides. When hydrazine alone is employed, the primary product is the dihydrazonium salt of 1,1,2,5,6,6-hexacyano-3,4-diazahexadiene. When the other bases are employed, the primary product is the corresponding quaternary ammonium, alkali metal or alkaline earth metal salt of 1,1,2,5,6,6-hexacyano-3,4-diazahexadiene. These salts are soluble and highly ionized in aqueous solution, and from such solutions other salts of 1,1,2,5,6,6-hexacyano-3,4-diazahexadiene may be prepared by metathesis.

In naming the compounds of this invention, the anion obtained on removal of the two protons from 1,1,2,5,6,6-hexacyano-3,4-diazahexadiene is called the 1,1,2,5,6,6-hexacyano-3,4-diazahexadienediide ion.

1,1,2,5,6,6-hexacyano-3,4-diazahexadiene and its salts are colored compounds which are useful as dyes. 1,1,2,5,6,6-hexacyano-3,4-diazahexadiene has not been isolated in the dry state. Acid conditions, such as treatment with the acidic ion-exchange column or addition of a mineral acid, which are necessary to regenerate the free compound from an aqueous solution of one of its salts, produce decomposition of the free compound.

The 1,1,2,5,6,6-hexacyano-3,4-diazahexadienediide ion is capable of existing in many resonance forms in which the two charges are visualized as associated with various atoms in the molecule. It is probable that solutions of this ion contain an equilibrium mixture of at least some of each of the possible resonance forms. Some of these resonance forms are visualized as follows:

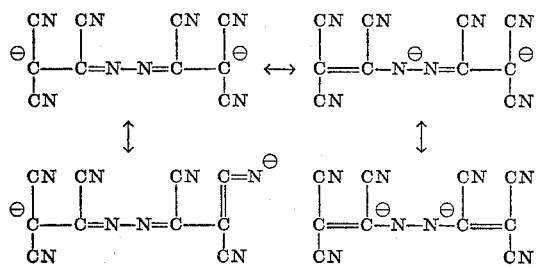

In a preferred embodiment of this invention, two molecular equivalents of tetracyanoethylene are added to a cold aqueous solution containing one molecular equivalent of hydrazine and at least two molecular equivalents of a base as defined above. For example the base may be hydrazine, tetraethylammonium hydroxide or the hydroxide of lithium, sodium, potassium rubidium, cesium, calcium, strontium, or barium. This mixture is stirred vigorously and the reaction is complete when all the tetracyanoethylene has disappeared into solution. The resulting solution contains the disubstituted salt of the base, with 1,1,2,5,6,6-hexacyano-3,4-diazahexadiene. This salt is isolated by evaporation of the solution. Other salts are prepared by methaesis with suitable cationic compounds as shown in Example V.

Tetracyanoethylene for use in this invention can be prepared by the reaction of malononitrile with an equimolar quantity of sulfur monochloride, suitably in refluxing chloroform. The tetracyanoethylene formed can be recovered by evaporation of the chloroform solution and purified by sublimation.

The following examples in which parts are by weight are illustrative of the invention.

EXAMPLE I

Hydrazonium 1,1,2,5,6,6-hexacyano-3,4-diazahexadienediide

A solution of 103 parts of hydrazine hydrate in 1000 parts of water is mixed rapidly with cooling with 128 parts of powdered tetracyanoethylene. Within 10–15 minutes solution is complete and there is obtained a yellow-brown solution of hydrazonium 1,1,2,5,6,6-hexacyano-3,4-diazahexadienediide in water.

EXAMPLE II

Tetraethylammonium 1,1,2,5,6,6-hexacyano-3,4-diazahexadienediide

To the aqueous solution of hydrazonium 1,1,2,5,6,6-hexacyano-3,4-diazahexadienediide prepared as in Example I there is added 210 parts of tetraethylammonium bromide and the mixture is stirred at room temperature until all the bromide is dissolved. The solution is cooled in an ice bath, and the orange-brown precipitate which forms is collected on a filter, washed with water and recrystallized from ethanol. There is obtained 85 parts of tetraethylammonium 1,1,2,5,6,6-hexacyano-3,4-diazahexadienediide in the form of orange needles. The product is again recrystallized from alcohol to give orange-red needles, M. P. 137–138° C.

Analysis.—Calculated for $C_{13}H_{20}N_5$: C, 63.38%; H, 8.18%; N, 28.43%. Found: C, 63.47%, 63.24%; H, 8.30%, 8.11%; N, 28.24%.

The light absorption spectrum of an acetone solution of this salt shows maxima at 456 millimicrons (molecular extinction coefficient 15,200) and at 478 millimicrons (molecular extinction coefficient 14,500).

EXAMPLE III

Trimethylbenzylammonium 1,1,2,5,6,6-hexacyano-3,4-diazahexadienediide

Ten parts of tetraethylammonium 1,1,2,5,6,6-hexacyano-3,4-diazahexadienediide is dissolved in 500 parts of hot water and a solution of 20 parts of trimethylbenzylammonium chloride in 200 parts of water is added. The orange precipitate which forms upon cooling is collected on a filter, washed with water and recrystallized from water. There is obtained 7 parts of trimethylbenzylammonium 1,1,2,5,6,6-hexacyano-3,4-diazahexadienediide in the form of orange plates, M. P. 175–178° C.

Analysis.—Calculated for $C_{30}H_{32}N_5$: C, 67.64%; H, 6.06%; N, 26.30%. Found: C, 67.55%, 67.41%; H, 6.23%, 6.02%; N, 26.23%, 26.41%.

EXAMPLE IV

*Silver 1,1,2,5,6,6-hexacyano-3,4-diazahexadienediide*

Two hundred fifty parts of a 5% solution of silver nitrate in water is added to a solution of 10 parts of tetraethylammonium 1,1,2,5,6,6-hexacyano - 3,4 - diazahexadienediide in 500 parts of hot water. The red precipitate which forms is collected on a filter and washed with water. There is obtained 9 parts of silver 1,1,2,5,6,6-hexacyano-3,4-diazahexadienediide in the form of red powder which decomposes without melting at about 250° C.

*Analysis.*—Calculated for $Ag_2C_{10}N_8$: Ag, 48.17%; C, 26.81%; N, 25.02%. Found: Ag, 48.27; C, 27.06%; N, 24.67%.

EXAMPLE V

A solution of hydrazine 1,1,2,5,6,6-hexacyano-3,4-diazahexadienediide is prepared as in Example I using about half the stated amount of water (i. e., 500 parts). A saturated aqueous solution of barium iodide is added to this. Part of the barium 1,1,2,5,6,6-hexacyano-3,4-diazahexadienediide which is formed is precipitated and is collected by filtration and dried. The aqueous filtrate is a solution of barium 1,1,2,5,6,6-hexacyano-3,4-diazahexadienediide. This is useful in the preparation of other 1,1,2,5,6,6-hexacyano-3,4-diazahexadienediide salts by reaction with aqueous solutions of the corresponding sulfate. Barium sulfate precipitates quantitatively as by-product and is readily filtered off, leaving an aqueous solution of the 1,1,2,5,6,6-hexacyano-3,4-diazahexadienediide salt of the cation which was introduced in the form of its sulfate. In this way, barium 1,1,2,5,6,6-hexacyano-3,4-diazahexadienediide reacts with aqueous solutions of the sulfates of Al, Ce, Cs, $Cr^{++}$, $Cr^{+++}$, $Co^{++}$, $Co^{+++}$, $Cu^{++}$, $Fe^{++}$, $Fe^{+++}$, Ga, In, $Ni^{++}$, Li, K, $Mn^{++}$, Rb, $Sn^{++}$, $Sn^{++++}$, Th, $UO_2$, VO, Zn, Zr, $NH_4^+$, $C_6H_5NH_3^+$, $(C_2H_5)_2NH_2^+$, $(CH_3)_3NH^+$ and $(CH_3)_3S^+$ to yield the corresponding metal, amine or sulfonium salts of 1,1,2,5,6,6-hexacyano-3,4-diazahexadiene. The salts are isolated as crystalline solids by evaporation of the solutions.

The readily soluble salts of 1,1,2,5,6,6-hexacyano-3,4-diazahexadiene, such as the hydrazonium, tetramethylammonium, sodium and potassium salts, react with aqueous solutions of basic dyes to precipitate the corresponding salts which are useful as printing inks and hectograph inks. Thus tetraethylammonium 1,1,2,5,6,6-hexacyano-3,4-diazahexadienediide reacts with an aqueous solution of crystal violet to form a precipitate to the crystal violet 1,1,2,5,6,6-hexacyano-3,4-diazahexadienediide salt which is a dark, almost black pigment. This is dissolved in ethanol to give a hectograph ink. Other basic dyes, such as methyl violet, rosaniline, and the like, react with 1,1,2,5,6,6-hexacyano-3,4-diazahexadienediide salts to give the corresponding dye salts which have low solubility in water and are useful as pigments and, in alcohol solutions, as hectograph inks.

In the use of 1,1,2,5,6,6-hexacyano-3,4-diazahexadiene compounds of this invention as dyes, a fabric, e. g., wool, silk, nylon etc. containing amino and/or amido groups, is immersed for a few minutes in a boiling aqueous solution or dispersion of the compound (for example, hydrazonium 1,1,2,5,6,6 - hexacyano-3,4-diazahexadienediide), the fabric becomes colored yellow to brown, depending on the particular salt used, and rinsing the colored fabric does not remove the dye. More elaborate dyeing techniques, such as are well known in the art, may be employed to heighten the color produced and to render it more permanent.

The presence of at least some water in the reaction of tetracyanoethylene with hydrazine according to this invention is essential, although in addition to water an organic solvent inert to the reactants may be employed, e. g., diethyl ether, hexane, cyclohexane and the like. The temperature of the reaction is not critical. However, to avoid partial loss of the reactants through side reactions such as polymerization, it is preferred to carry out the reaction at temperatures below 50° C., and particularly below 25° C.

The foregoing detailed description has been given for clearness of understanding only and no unnecessary limitations are to be understood therefrom. The invention is not limited to the exact details shown and described. Obvious modifications will occur to those skilled in the art.

The embodiments of the invention in which an exclusive property or privilege is claimed are defined as follows:

1. A salt of 1,1,2,5,6,6-hexacyano-3,4-diazahexadiene.
2. A compound of the 1,1,2,5,6,6-hexacyano-3,4-diazahexadienediide anion with a cation.
3. Hydrazonium 1,1,2,5,6,6-hexacyano-3,4-diazahexadienediide.
4. A metal salt of 1,1,2,5,6,6-hexacyano-3,4-diazahexadiene.
5. A salt of 1,1,2,5,6,6-hexacyano-3,4-diazahexadiene with a basic dye.
6. Process of preparing a salt of 1,1,2,5,6,6-hexacyano-3,4-diazahexadiene which comprises reacting tetracyanoethylene with one mole of hydrazine and at least two molar equivalents of a base.
7. Process of preparing the hydrazonium salt of 1,1,2,5,6,6-hexacyano-3,4-diazahexadiene which comprises reacting tetracyanoethylene with at least three moles of hydrazine.

References Cited in the file of this patent

UNITED STATES PATENTS

| | | |
|---|---|---|
| 2,448,823 | Popkin | Sept. 7, 1948 |
| 2,762,810 | Heckert | Sept. 11, 1956 |
| 2,762,811 | Middleton | Sept. 11, 1956 |
| 2,762,832 | Heckert | Sept. 11, 1956 |